Jan. 13, 1931.　　　　E. A. PERRIN　　　　1,789,254
FLYING MACHINE
Filed May 16, 1929　　　3 Sheets-Sheet 1
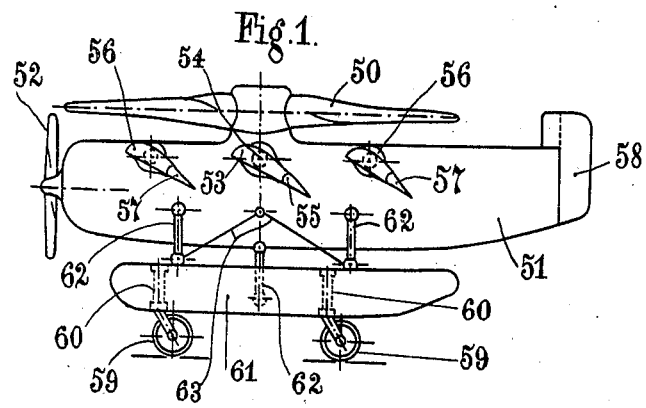
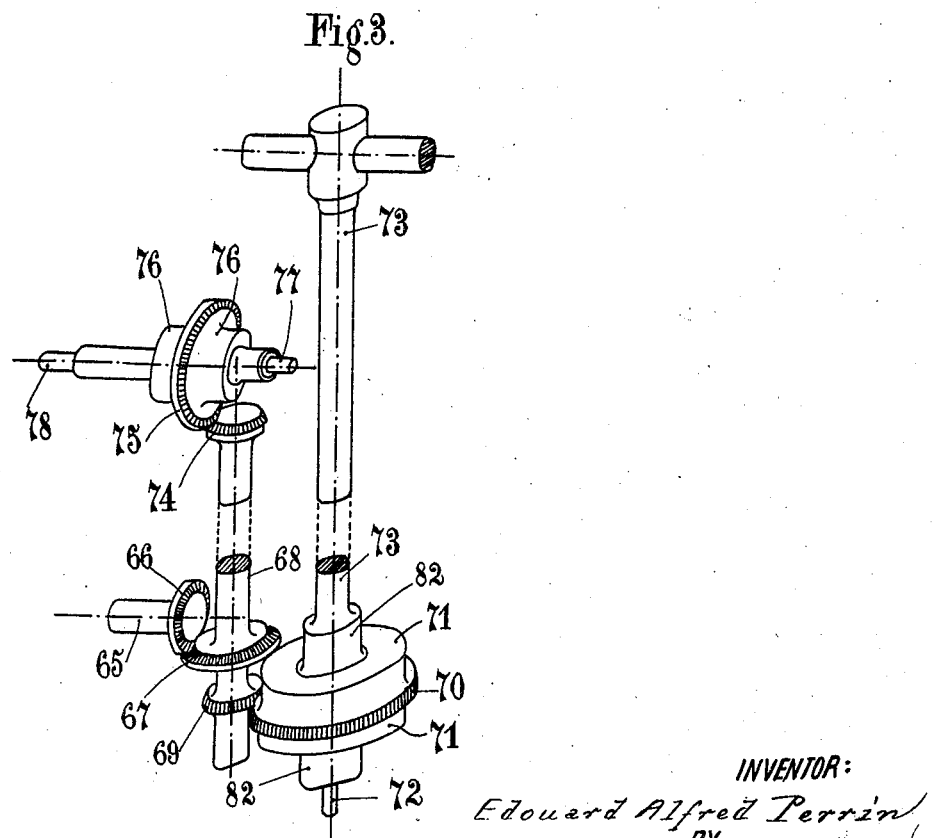
INVENTOR:
Edouard Alfred Perrin
BY
ATTORNEY Jan. 13, 1931.  E. A. PERRIN  1,789,254
FLYING MACHINE
Filed May 16, 1929  3 Sheets-Sheet 2
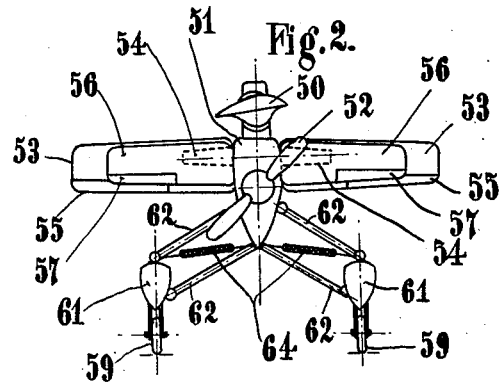
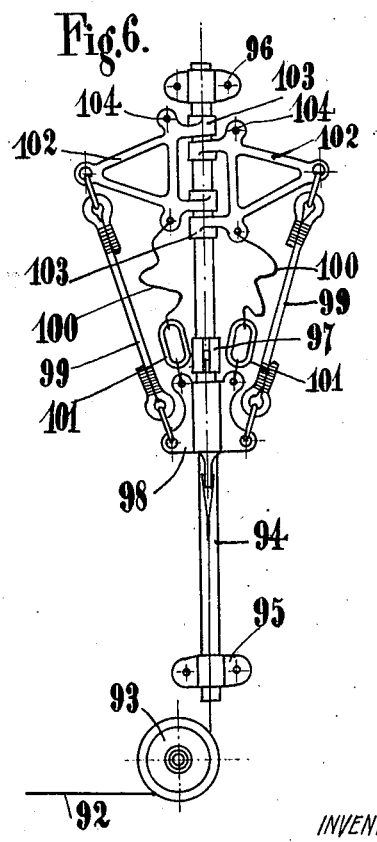
INVENTOR:
Edouard Alfred Perrin
BY
ATTORNEY

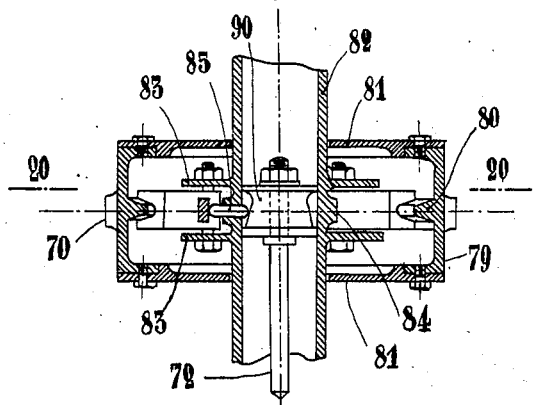
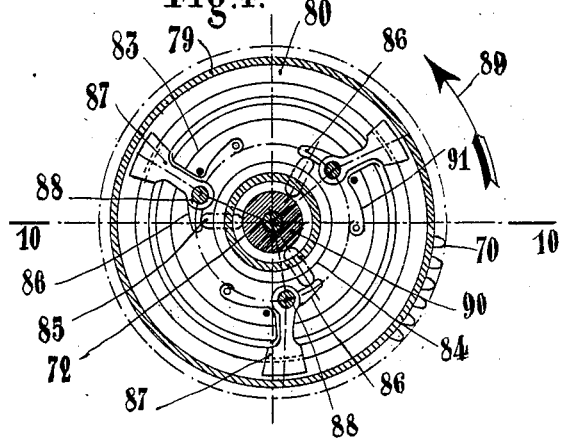

UNITED STATES PATENT OFFICE

EDOUARD ALFRED PERRIN, OF PARIS, FRANCE

FLYING MACHINE

Application filed May 16, 1929, Serial No. 363,524, and in France July 25, 1928.

This invention has for its object a flying machine adapted to fly either as a helicopter, when both support and propulsion may be obtained by the use of one single propeller mounted upon a substantially vertical shaft, or as an airplane, propulsion then being obtained by the use of one or more tractive or propulsive propellers mounted upon substantially horizontal shafts, the first kind of flight being intended for low translational speeds and preferably for use when alighting on land or water, while the second kind of flight is suitable for high speed translation and for unintended alightings on land or water.

The machines which constitute the subject-matter of the invention are adapted for use in substantially vertical flights, but the stabilizing and steering devices peculiar to this kind of flight are not to be considered as parts of this invention and may be similar or analogous to already known devices as far as same are compatible with the special devices as hereinafter described.

The primary elements of this invention will be more fully described with reference to Figs. 1 to 6 of the appended drawings.

Generally, these elements comprise:—

In combination with a variable pitch supporting propeller mounted upon a substantially vertical shaft:

1. One or more so-called "translation or tractive" propellers mounted upon substantially horizontal shafts. Said propellers, which may be of variable pitch construction, may at will be tractive or propulsive in operation.

2. A transmission means for transmitting the driving movement to the individual propellers.

Such transmission means, in addition to speed change devices, comprise special members for the optional coupling of the engine or engines with the supporting propeller or the various translation propellers.

As will be explained hereinafter, these optional coupling members, which are to be actuated by the pilot according to the kind of flight to be obtained, may concern only the drive for the supporting propeller, but they are preferably adapted also for the translation or tractive propellers and, in this case, it may be convenient to do away with the pitch adjustment devices as far as the latter are concerned.

Moreover, the optional coupling members are preferably so arranged as to make it possible to use either all the engines or any number of the same to drive either the supporting propeller alone or all or some of the translation propellers, or any combination of the various propellers.

Further, while the optional coupling members may be provided in any suitable manner, they are preferably so arranged that, when operative, they will drive the controlled members in one direction of rotation only, while remaining inoperative in the reverse direction. In this case, through suitable operations to be described later on, the pilot, before coupling a propeller with the driving transmission means, causes it to take, under the action of the surrounding air, a rotational speed at least equal to that which it is to assume under the action of the transmission means; such arrangement having the advantage that the optional coupling members may be of lighter construction than if they were to supply to the propeller or propellers concerned the frequently considerable kinetic energy necessary to accelerate the same. Moreover, as far as the supporting propeller is concerned the said arrangement is indispensable to make glide-flights possible through self-rotation of said propeller without any interference from the pilot.

3. A group of so-called "main" supporting surfaces arranged transversally to the fuselage or fuselages close to the axis of the supporting propeller; these surfaces, which may be no more than two in number, being rotably connected to the fuselage or fuselages in order to permit the pilot to set them into a substantially vertical position for practicing vertical helicopter flight, an inclined position for practicing low translational speed helicopter flight and a position close to the horizontal for practicing ordinary airplane flight. In the case of helicopter flight, the action of the main supporting surfaces together with that of the fuselage contributes to counteract the tendency of the machine to rotate in the direction contrary to that of the supporting propeller. In the case of airplane flight, the action of the main supporting surfaces is similar to that of the supporting surfaces in a conventional airplane.

All or some of these surfaces may be provided on the whole or part only of their length with ailerons controlled by the pilot and intended to secure transversal stability in the case of airplane flight, and to intensify the action of the surface itself in the case of helicopter flight.

Further, the span of the main supporting surfaces may amount to only the diameter of the circle swept by the supporting propeller; however, if the consequent increase in weight may be dealt with, the span may be increased beyond the dimensions indicated where the machine is to possess special qualities in connection with easily manageable airplane flight landings.

4. A group of so-called "auxiliary" supporting surfaces arranged transversally to the fuselage or fuselages in front of or behind, or both in front of and behind, the main surfaces and preferably below the circle swept by the supporting propeller so that in helicopter flight they may be subjected to the action of the air blown by the supporting propeller. The auxiliary supporting surfaces are swingably mounted in the fuselage or fuselages in order that the the pilot may set them into a substantially vertical position for vertical helicopter flight, an inclined position for low translational speed helicopter flight and a substantially horizontal position for airplane flight. Such setting may be correlated with or independent from that of the main supporting surfaces. In either case, the auxiliary surfaces may be provided with ailerons to be controlled by the pilot and which are useful chiefly where the setting thereof is correlated with that of the main supporting surfaces.

The auxiliary surfaces in helicopter flight, supplement the action of the main surfaces; in airplane flight, they contribute to support and secure the longitudinal stability of the machine by acting as horizontal steering surfaces.

5. One or more fuselages containing in addition to the useful load carried the engine or engines, the supporting and driving members for the various propellers. These fuselages may preferably be streamlined so that only the least possible resistance may be opposed to air flow both in the vertical and horizontal directions. Moreover, the fuselage or fuselages will preferably extend forward and rearward beyond the limit of the circle swept by the supporting propeller, namely forward where they carry the tractive propeller or propellers; rearward where they they carry the propulsive propeller or propellers if such be provided. But in all cases one or more steering rudders are provided which are vertical surfaces similar to those to be found in conventional airplanes and are used in the same manner both by low translational helicopter flight and high speed airplane flight.

6. A special landing gear for use on land or water or on both. This gear is made necessary by the fact that the alighting on land or water of such machines as are contemplated by this invention are subject both to the conditions particular to helicopter flight where the machine is liable to come into contact with the land or water with a high vertical speed and in a horizontal direction inclined at any angle to its longitudinal axis, and also to the highly different conditions particular to airplane flight where the contact is with the land or water while the horizontal speed is still a considerable one. This special gear comprises, as far as landing is concerned, groups of wheels adapted for self-setting in all directions, at least three and preferably four in number, and carrying and bracing members for the self-setting wheels, these members being connected to the fuselage or fuselages through elastic means affording a preferably wide vertical displacement of said members relatively to the fuselage or fuselages. The carrying members may be streamlined in order that they may oppose only the least possible resistance to the flow of air both in the vertical and horizontal directions. Where the machine is liable to alight successively on land and water, the carrying members may be of water-tight construction, when they will operate as floats.

Where alighting on water only is contemplated, the self-setting wheel groups and the devices whereby the supporting members are yieldingly connected to the fuselage or fuselages may conveniently be done away with. Further, in order to make for lighter construction, the elastic devices may conveniently be so designed that beyond the limit of their normal elastic operation they will afford a supplemental vertical displacement of the supporting members relatively to the fuselage or fuselages. This supplemental displacement will be useful where unexpected and particularly difficultly manageable alightings on land or water are to be dealt with, when the effort necessary for braking the vertical speed would exceed the capacity of the elastic devices. In this case, the supplemental braking action will be obtained through a frictional action between suitable members similar to those described hereinafter which will automatically come into play after the braking capacity of the yielding devices is exhausted.

In the accompanying drawings, Figs. 1 to 6 give by way of non-limitative example embodiments of such devices as constitute the machine, the general features of which have been given hereinabove.

Fig. 1 is a lateral view of one embodiment of a helicopter airplane.

Fig. 2 is a front view of the machine.

Fig. 3 is a diagrammatic perspective view of the motion transmission gear.

Fig. 4 is a vertical cross-section of one embodiment of an optional coupling device, taken on line 20—20 of Fig. 5.

Fig. 5 is a horizontal section on line 10—10 of Fig. 4.

Fig. 6 is one embodiment of the yielding connecting device for the landing gear provided with a supplemental braking device.

Referring now to Figs. 1 and 2, the single supporting propeller 50 is arranged at the upper part of the machine above the fuselage 51. There is one single traction propeller provided at the front end at 52. The main supporting surfaces 53 are two in number and rotably mounted upon trunnions 54 projecting from either side of the fuselage; and they are provided with ailerons 55. The auxiliary supporting surfaces 56, which are four in number, are provided with ailerons 57 and rotably connected to the fuselage similarly to main surfaces 53. The fuselage has secured to the rear end thereof one single steering rudder 58. The landing gear comprises four groups of self-setting wheels 59; these wheels being pivotally secured to the connecting floats 61 through pins 60. Said floats are connected to the fuselage 51 through three groups of struts 62 provided at either end thereof with ball-and-socket joints; the connection being completed by ties 63. The yielding device is provided by rubber cables 64 arranged in the planes of the front and rear struts 62 respectively.

Referring to Fig. 3, the motion transmission device comprises a shaft 65 driven by one of the engines and acting through bevel gears 66, 67 upon a vertical shaft 68; said vertical shaft driving the supporting propeller at the lower end thereof by means of a spur gear 69 meshing with a spur ring 70 keyed upon the special optional coupling member 71. The latter is controlled by the pilot through a rod 72 and, when operative, transmits the motion to the shaft 73 of the supporting propeller 50.

On the other hand, the shaft 68 drives the traction propeller shaft 78 through a bevel gear pair 74, 75, the spur ring 75 being secured to the special optional coupling member 76 which is controlled by the pilot through rod 77 and, when operative, drives shaft 78.

For the sake of simplicity, only the rotating parts are shown in the figure, bearings and supports being omitted.

The details of the optional coupling members 71 and 76 are shown in Figs. 4 and 5 which refer more particularly to member 71. The teeth of ring 70 act upon ring 79 provided on its inner side thereof with a flange 80 of trapezoidal section; ring 79 being provided with two jaws 81. Moreover, the propeller shaft 73 has an extension in the form of a hollow shaft 82 provided with two flanges 83 and a collar 84. Intermediate between these flanges the collar has drilled in it holes adapted to guide push pins 85 which engage the heels 86 of pawls 87 pivoted upon pins 88 in flanges 83. The pawls are each formed with a trapezoidal slot fitting upon flange 80, the central line of the pawls being inclined radially in the direction contrary to that of the driving movement represented by the arrow 89.

Pins 85 may be actuated through a frusto-conical mandrel 90 operated by the pilot by pulling or pushing rod 72.

The operation is as follows:—

As the pilot pushes rod 72, pins 85 act through heels 86 upon pawls 87 which are disengaged from flange 80; shaft 82 then has no connection with spur ring 70. On the contrary, pulling rod 72 withdraws pins 85 from action upon pawls 87, whereupon leaf springs 91 (see Fig. 4) then press pawls 87 against flange 80, thus wedging the same thereupon, whereby shaft 82 is coupled to spur ring 70.

The same result might be obtained by substituting for flanges 80 a series of ratchet teeth adapted to co-operate with pawls similar to 87, but this arrangement is not so convenient as the one just described which has the advantage that its action suffers no delay. For helicopter flight, the pilot renders the coupling member 76 inoperative, but does render member 71 operative, when the supporting propeller alone is driven. In order to pass over from helicopter flight to airplane flight, after the pilot has set the supporting surfaces 53 and 56 in a substantially horizontal position, he will practice a flight similar to the gliding flight of conventional machines by dipping the axis of fuselage 51 at an angle to the water-level line. On the translational speed increasing, the pilot will disengage propeller 52 which is set into motion by the action of the air; and when the speed of propeller 52 is sufficient, the pilot will couple the same to the engine by making member 76 operative, after which he will cut out the action of the supporting propeller by making member 71 inoperative.

In order to pass over from airplane flight to helicopter flight the operation is the same. The supporting propeller is progressively accelerated when the pilot straightens out the axis of the fuselage 51 while the action of the traction propeller 52 is reduced. The vertical speed of the machine increases until the rotational speed of the supporting propeller becomes sufficient; the pilot will then set member 71 into operation and member 76 out of operation.

Finally, referring now to Fig. 6, the yielding connecting means between float 61 and fuselage 51 is arranged within the latter and provided with the complementary friction braking members as above referred to. Rubber cables 64 are replaced by cables 92 of inextensible construction. Cable 92 is passed over a pulley 93 rigid with the fuselage, and the yielding means is mounted upon a vertical tube 94 secured to the fuselage through bearings 95, 96 and 97.

Cable 92 is attached to a slide 98 which has secured thereto rubber cables 99 and two metal cables 100, the latter being attached through yielding rings 101 the strength of which is considerable while its deformation capacity is small. The rubber cables 99 are secured each to one of a pair of brackets 102 slidably mounted upon tube 94 through sleeves 103.

The operation is as follows:—

On normal landing, metal cables 100 are not brought into play; cable 92 acting upon slide 98 stresses the rubber cables 99 while the brackets 102 remain jammed upon tube 94, provided the spacing of sleeves 103 is not too large. On rough landing, after the rubber cables have become fully extended, cables 100 come into action and pull down the brackets 102. However, by the action of the rubber cables upon the extremities of brackets 102, a considerable stress is maintained upon sleeves 103, whereby a frictional action supplementing the braking effect already produced by the action of rubber cables 99 is developed. The landing once completed, brackets 102 may be brought back into their original positions by means of ears 104 formed thereon.

I claim as my invention:

In a flying machine and in combination, a single substantially vertical shaft; a supporting propeller fixed thereon, all the blades of the propeller rotating in the same direction as said shaft; an elongated fuselage extending substantially along the full diameter of the circle swept by the propeller blades; main supporting surfaces, at least two in number, carried by the fuselage, said main surfaces extending substantially through the entire surface of the blade-swept circle; smaller auxiliary supporting surfaces similar to the main supporting surfaces; the supporting surfaces, both main and auxiliary, being at least four in number and being so disposed as to act substantially on the whole of the downward air current from the supporting propeller and in such way to enable the rotation of said fuselage in any direction; coupling devices operated by the pilot for transmitting engine power to said vertical shaft to rotate the same and the propeller thereon in one direction only, said coupling devices acting so that the propeller blades may be set in rotation and kept rotating by the mere action of the surrounding air currents while the engine power is cut off from the vertical shaft; substantially horizontal shafts; a propeller fixed thereon; and additional coupling devices actuated by the pilot for connecting a horizontal shaft with engine power, said horizontal shaft coupling devices being substantially similar to the vertical shaft coupling devices and enabling the pilot to obtain the rotation of the propeller on the horizontal shaft by the direct impulse of the surrounding air currents while engine power is uncoupled from said horizontal shaft; engine power, when coupled, driving said horizontal shaft only in one direction.

In testimony whereof I affix my signature.

EDOUARD ALFRED PERRIN.